(12) United States Patent
Dinter et al.

(10) Patent No.: US 8,632,437 B2
(45) Date of Patent: Jan. 21, 2014

(54) DRIVE SYSTEM FOR A WIND TURBINE

(75) Inventors: Ralf Martin Dinter, Gelsenkirchen (DE); Arno Klein-Hitpass, Aachen (DE); Jan-Dirk Reimers, Aachen (DE)

(73) Assignee: Siemens Aktiengesellschaft, München (DE)

( * ) Notice: Subject to any disclaimer, the term of this patent is extended or adjusted under 35 U.S.C. 154(b) by 1 day.

(21) Appl. No.: 13/438,506

(22) Filed: Apr. 3, 2012

(65) Prior Publication Data

US 2013/0088016 A1    Apr. 11, 2013

(30) Foreign Application Priority Data

Apr. 4, 2011 (EP) .................................... 11002782

(51) Int. Cl.
*F16H 57/08* (2006.01)
(52) U.S. Cl.
USPC ......................................................... 475/347
(58) Field of Classification Search
USPC .......... 475/347; 74/606 R; 248/659, 660, 661
See application file for complete search history.

(56) References Cited

U.S. PATENT DOCUMENTS

| 2,814,352 | A | * | 11/1957 | Muller ........................... 180/295 |
| 3,155,070 | A | * | 11/1964 | Jebens et al. ...................... 440/4 |
| 3,943,787 | A | * | 3/1976 | Hicks ............................... 74/410 |
| 4,088,352 | A | * | 5/1978 | Kling ............................... 290/55 |
| 4,096,769 | A | * | 6/1978 | Horikiri et al. ................. 475/347 |
| 5,873,560 | A | * | 2/1999 | Serdar et al. .................... 248/562 |
| 6,030,177 | A | * | 2/2000 | Hager ............................... 416/87 |
| 6,232,673 | B1 | | 5/2001 | Schoo et al. |
| 6,956,300 | B2 | * | 10/2005 | Gizara ............................. 290/43 |
| 7,621,843 | B2 | * | 11/2009 | Madge et al. ................... 475/346 |
| 8,128,525 | B2 | | 3/2012 | Dinter et al. |
| 8,182,242 | B2 | * | 5/2012 | Harrington et al. ........... 417/363 |
| 8,192,322 | B2 | * | 6/2012 | Van Bogaert et al. ........ 475/331 |
| 2010/0164232 | A1 | | 7/2010 | Siegfriedsen |
| 2010/0230520 | A1 | | 9/2010 | Brammer et al. |
| 2011/0068645 | A1 | | 3/2011 | Pötter et al. |
| 2011/0147508 | A1 | | 6/2011 | Rittler |
| 2012/0067138 | A1 | | 3/2012 | Klein-Hitpass et al. |
| 2012/0108380 | A1 | | 5/2012 | Dinter et al. |
| 2012/0125150 | A1 | | 5/2012 | Dinter et al. |
| 2013/0095972 | A1 | * | 4/2013 | Dinter et al. ................... 475/149 |

FOREIGN PATENT DOCUMENTS

| EP | 1 045 139 A2 | 10/2000 |
| EP | 1243791 A2 | 9/2002 |

(Continued)

*Primary Examiner* — Dirk Wright
(74) *Attorney, Agent, or Firm* — Henry M. Feiereisen LLC (57) ABSTRACT

A drive system has a transmission unit comprising at least one planet wheel stage, which has a hollow wheel, several planet wheels, a planet carrier and a sun wheel. Furthermore, a first shaft associated with the transmission unit is provided, which has a coupling flange that can be connected to a work machine shaft or rotor shaft and is mounted via the planet carrier. The transmission unit and a motor unit or generator unit connected to a second shaft of the transmission unit are enclosed by a gear housing which has a cardanic circumferentially symmetric or partially symmetric suspension for connection to a supporting structural element of the wind turbine.

21 Claims, 5 Drawing Sheets

(56) References Cited

FOREIGN PATENT DOCUMENTS

| | | |
|---|---|---|
| EP | 1 508 692 A1 | 2/2005 |
| EP | 1544504 A2 | 6/2005 |
| EP | 1 593 867 A1 | 11/2005 |
| EP | 10 2007 012 408 A1 | 9/2008 |
| EP | 2 295 147 A1 | 3/2011 |
| EP | 2 372 148 A1 | 10/2011 |
| EP | 2 457 663 A1 | 5/2012 |
| GB | 2002488 A | 2/1979 |
| WO | WO 2008/031694 A1 | 3/2008 |
| WO | WO 2009/068484 A1 | 6/2009 |
| WO | WO 2010/020287 A1 | 2/2010 |

* cited by examiner

DRIVE SYSTEM FOR A WIND TURBINE

CROSS-REFERENCES TO RELATED APPLICATIONS

This application claims the priority of European Patent Application, Serial No. EP11002782, filed Apr. 4, 2011, pursuant to 35 U.S.C. 119(a)-(d), the content of which is incorporated herein by reference in its entirety as if fully set forth herein.

BACKGROUND OF THE INVENTION

The present invention relates to a drive system for a wind turbine.

The following discussion of related art is provided to assist the reader in understanding the advantages of the invention, and is not to be construed as an admission that this related art is prior art to this invention.

Besides slow-running gearless direct drive systems and medium-fast-running drive trains with one- or two-stage gearboxes, fast-running drive trains which have three or more gearbox stages and which are conceptually fundamentally different are also used in wind turbines at present. These drive train concepts each embrace a number of variants with modular, open and partially integrated system architecture.

Essentially a heavy machine drive train comprises system components, such as power connection elements, motors or generators, couplings, gearboxes and drive shafts. Converters are frequently provided lineside. Brakes are often provided in the form of mechanical brakes on a fast-running shaft between gearbox and motor or generator, as braking torques are smaller there because of the gear ratio.

In systems with driven components, such as wind turbines or mill drive systems, forces which are undesired and which can damage or destroy components also occur. These may be conditioned by the application or may be inherent to the system. In particular, couplings between gearbox and motor and/or generator, drive shafts and gearbox are frequently exposed to damaging torsional and vibrational forces as well as bending stresses within drive and output shafts which at least have to be reduced. In some cases this can be achieved by incorporating gearbox, motor or shaft bearings that reduce forces or vibrations.

In wind turbines in particular, stresses conditioned by the effect of wind occur in addition to normal machine drive forces. Sometimes highly irregular wind strengths or directions can introduce considerable tensile, compressive and lateral forces in the main shaft, main bearing, machine frame and drive train. These forces act as undesired additional or special forces. System components or parts must then resist these additional or special forces. Examples of special events to be considered include gusts of wind that occur only once every few decades, braking loads, shedding of large loads or power failures. Such special events can cause considerable deformations in main frames of wind turbines. This leads for example to movements in foundation bearings for drive train components. These movements can in turn induce constraining forces in the drive train which can result in severe damage to bearings and other force-conducting parts of a drive train of a wind turbine.

It would therefore be desirable and advantageous to obviate prior art shortcomings and to provide an improved reliable, energy-efficient and easy-to-maintain drive system for a wind turbine.

SUMMARY OF THE INVENTION

According to one aspect of the present invention, a drive system includes a transmission unit with at least one planet wheel stage, which has a hollow wheel, several planet wheels, a planet carrier and a sun wheel. Furthermore, a first shaft associated with the transmission unit is provided, which has a coupling flange that can be connected to a work machine shaft or rotor shaft and is mounted via the planet carrier. The coupling flange is preferably designed such that it enables a flexible coupling of a work machine or rotor shaft, in particular to provide an angular offset. This flexible coupling with an angular offset will be referred to hereinafter as a cardanic coupling or a cardanic suspension. Such a coupling can for example be realized by means of elastic bolts. The transmission unit and a motor unit or generator unit connected to a second shaft of the transmission unit are enclosed by a gear housing which has a cardanic circumferentially symmetric or partially symmetric suspension for connection to a supporting structural element of the wind turbine. The supporting structural element can, for example, be a foundation bearing with a connection to a frame or a nacelle of the wind turbine. Effects damaging to bearings or gearings can be prevented by a dual or fully cardanic suspension of the drive system inside the supporting structural element and by a cardanic connection of the coupling flange. Movements in foundation bearings which arise because of deformations of the main frame of a wind turbine and which in accordance with existing solutions are coupled into a drive train by suspending said drive train do not result in undesired constraining forces according to the invention, but are prevented by the cardanic suspension. Thus the drive system is merely exposed to torsional stresses.

According to an advantageous feature of the present invention, the transmission unit may be connected to a generator unit when the inventive drive system is used in a wind turbine. Furthermore, the first shaft of the transmission unit is in this case a gearbox-side drive shaft. The second shaft of the transmission unit is in contrast a gearbox-side output shaft. The coupling flange of the gearbox-side drive shaft may be connected to a rotor shaft when the inventive drive system is used in a wind turbine.

According to another advantageous feature of the present invention, elastomer bolts that can be axially removed from a ring support or from ring segment supports may be provided for fully cardanic suspension. Additionally the coupling flange may have several essentially equidistantly arranged boreholes in the circumferential direction, into which axially removable elastomer bolts can be inserted and connected to a corresponding work machine shaft coupling flange or rotor shaft coupling flange. Due to the axially removable elastomer bolts, which may be replaced individually, the drive system can be radially removed or integrated in respect of a shaft arrangement of the transmission unit. This represents a considerable simplification for installation and maintenance. Moreover, compared to existing solutions, considerably less installation space is required.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
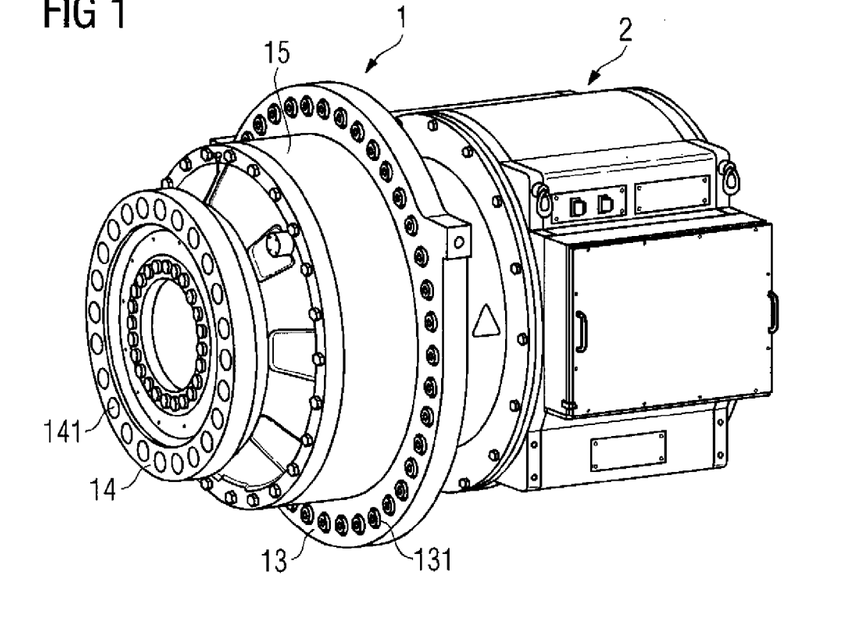
FIG. 1 shows a perspective illustration of an inventive drive system for a wind turbine.

Turning now to the drawing, and in particular to FIG. 1, there is shown a drive system for a wind turbine having a transmission unit 1 with a coaxially constructed first 11 and second planet wheel stage 12. According to FIG. 2 each planet wheel stage 11, 12 comprises a hollow wheel 114, 124, several planet wheels 113, 123, a planet carrier 112, 122 and a sun wheel 111, 121. The transmission unit 1 is connected to a generator unit 2 via an output shaft of the transmission unit and is arranged together therewith in a gear housing 15. The transmission unit 1 is assigned a drive shaft molded onto the planet carrier 112 of the first planet wheel stage 11, which has a coupling flange 14 that can be connected to a rotor shaft and is mounted via the planet carrier 112 of the first planet wheel stage 11. Two bearings 115 and 116, which represent a first and a second main bearing of the transmission unit 1, are assigned to the planet carrier 112 and are arranged between planet carrier side walls and gear housing 15.

The gear housing 15 has a fully cardanic circumferentially symmetric or partially symmetric suspension 13 for connection to a supporting structural element of the wind turbine. This supporting structural element is for example a frame or a nacelle of the wind turbine.

Figure 2:
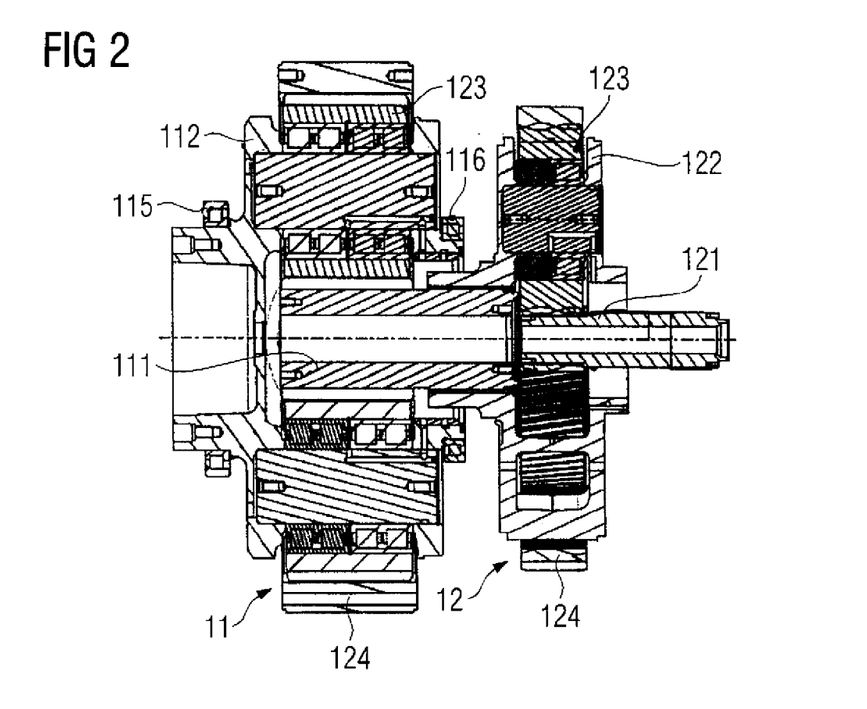
FIG. 2 shows a sectional view of gearbox components of the drive system illustrated in FIG. 1.

The second planet wheel stage 12 is dimensioned in respect of its transmission such that when a number of generator poles divisible by 3 is chosen and with an optimal design for rated speed, essentially identical external diameters of the stator of the generator unit 2 and the hollow wheel 124 of the second planet wheel stage 12 are produced. Bearings of the transmission unit 1 on the generator side are designed to be electrically insulating. Thus a flow of current from the transmission unit 1 into a rotor of the generator unit 2 can be prevented.

The fully cardanic suspension of the drive system in combination with an absence of transversal and radial force and a two-point or torque mounting of the drive system produces a drive train which is only exposed to torsion. By combining transmission unit 1 and generator unit 2 on the housing side by exploiting their high rigidity, at least a significant reduction in constraining forces can be achieved in the drive train despite significantly less stiff support elements in the cardanic suspension.

By combining the two-point or torque mounting of the drive system with the fully cardanic suspension of the gear housing 15 which also encloses the generator unit 2, significantly less stress is placed on a coupling arranged between transmission unit 1 and generator unit 2. This coupling can therefore be designed to be considerably stiffer. In turn this offers further advantages in respect of operating dynamics.

The main bearing of the transmission unit 1 can furthermore be embodied without consideration of supports of downstream components. As a result, it becomes possible to use slowing rings, which merely require significantly less installation space, for the main bearing of the transmission unit 1 in a technically controllable form for large drives. In addition, torsion-conditioned shaft alignment twisting has inventively become irrelevant to damage thanks to the fully cardanic suspension for the transmission unit 1.

Figure 3:
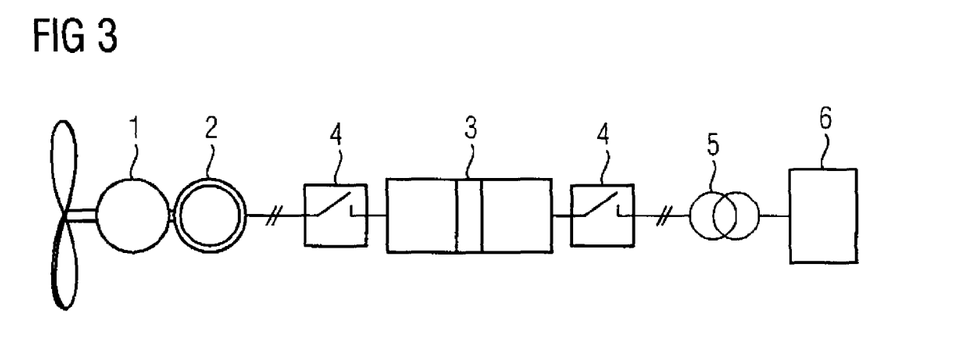
FIG. 3 shows a schematic illustration of a drive system for a wind turbine including power connection.

The generator unit 2 in the present exemplary embodiment 3 has independent winding systems which are connected to a full power converter 3 shown in FIG. 3. The full power converter 3 enables grid-dynamic decoupling and is connected via reversing switch-disconnectors 4 to the generator unit 2 on one side and on the other side to a transformer 5 for injecting power into a power supply grid 6. In addition, separately insulated generator windings are provided for each pole. Furthermore, the three independent winding systems are connected outside the gear housing 15 enclosing the generator unit 2. The generator unit is designed to be 9- to 30-pole, preferably 12- to 24-pole.

A rotor of the generator is preferably connected in a rotatably fixed manner to a hollow shaft, to which a brake disk is connected in a rotatably fixed manner. The brake disk is, with a view to ease of access for maintenance purposes, advantageously arranged on a front face of the generator unit 2 facing away from the transmission unit 1. In addition, the rotor of the generator unit 2 comprises a grounding brush in accordance with the present exemplary embodiment. Thus a flow of current from the transmission unit 1 via the rotor of the generator unit is very unlikely.

Figure 4:
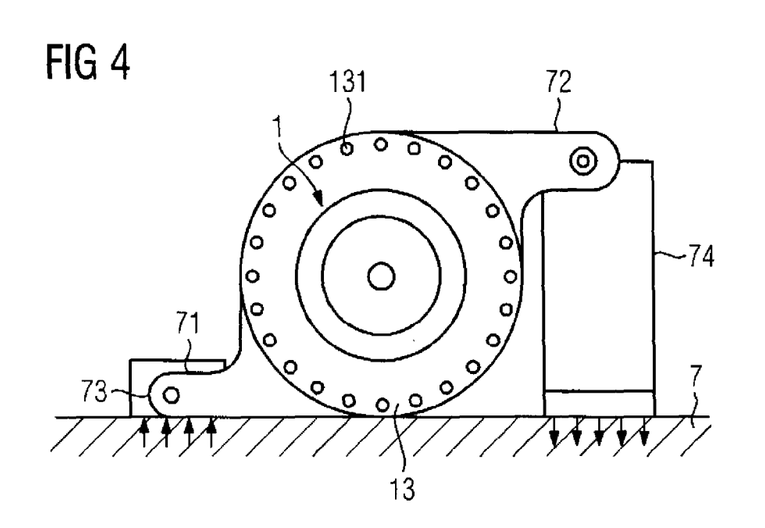
FIG. 4 shows a ring support for fully cardanic suspension of the drive system according to FIG. 1 with a corresponding two-arm torque support.

According to the exemplary embodiment illustrated in FIG. 4 the fully cardanic suspension 13 is formed by a ring support fully circumferentially radially enclosing the gear housing 15. The ring support 13 has several essentially equidistantly arranged boreholes 131 in the circumferential direction, into which first end sections of the elastic bolts are inserted. The elastic bolts are connected to a corresponding torque support on the supporting structural element 7 of the wind turbine. The corresponding torque support likewise comprises a ring element with essentially equidistantly arranged boreholes in the circumferential direction, into which second end sections of the elastic bolts are inserted. Additionally the corresponding torque support has two asymmetrically molded support arms 71, 72 according to the exemplary embodiment illustrated in FIG. 4, the end section of which is in each case inserted into a receptacle 73, 74 on the supporting structural element 7, where it is connected thereto.

The elastic bolts of the fully cardanic suspension 13 are axially removable elastomer bolts. The coupling flange 14 also has several essentially equidistantly arranged boreholes 141 in the circumferential direction according to FIG. 1, into which axially removable elastomer bolts are inserted and are connected to a corresponding rotor shaft coupling flange. When the elastomer bolts of the fully cardanic suspension 13 and of the coupling flange 14 are removed, a radial removal or insertion direction of the drive system is enabled in respect of a shaft arrangement of the transmission unit 1.

Add-on units of the transmission unit 1, for example oil system, cooler and hydraulics, are advantageously mounted directly on the supporting structural element 7 of the wind turbine. The add-on units are thus decoupled from the gear housing 15 by means of the fully cardanic suspension 13 and an elastic coupling between rotor shaft and drive shaft of the transmission unit 1.

Figure 5:
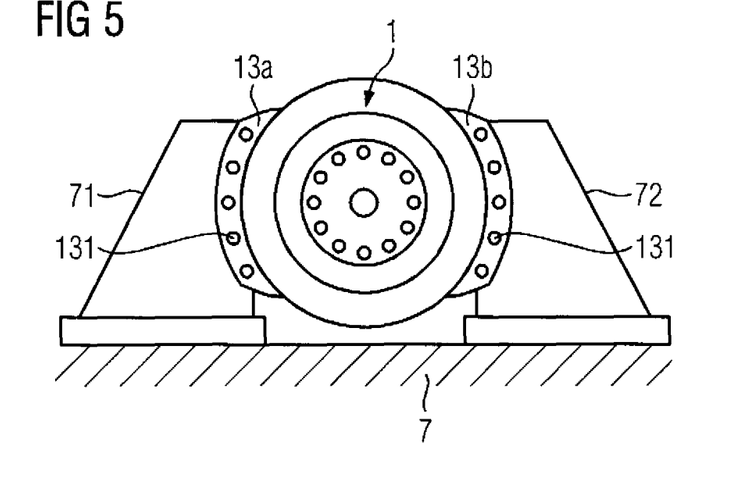
FIG. 5 shows two ring segment supports for fully cardanic suspension of the drive system according to FIG. 1 with corresponding torque supports.
Figure 6:
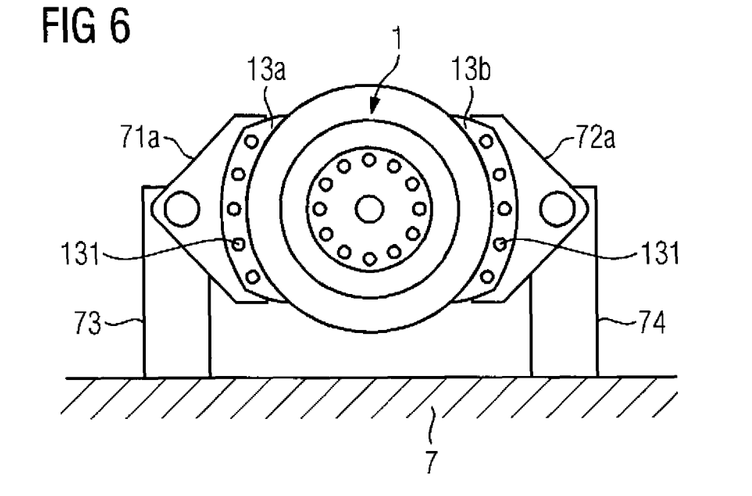
FIG. 6 shows two ring segment supports in an embodiment different from FIG. 5.
Figure 7:
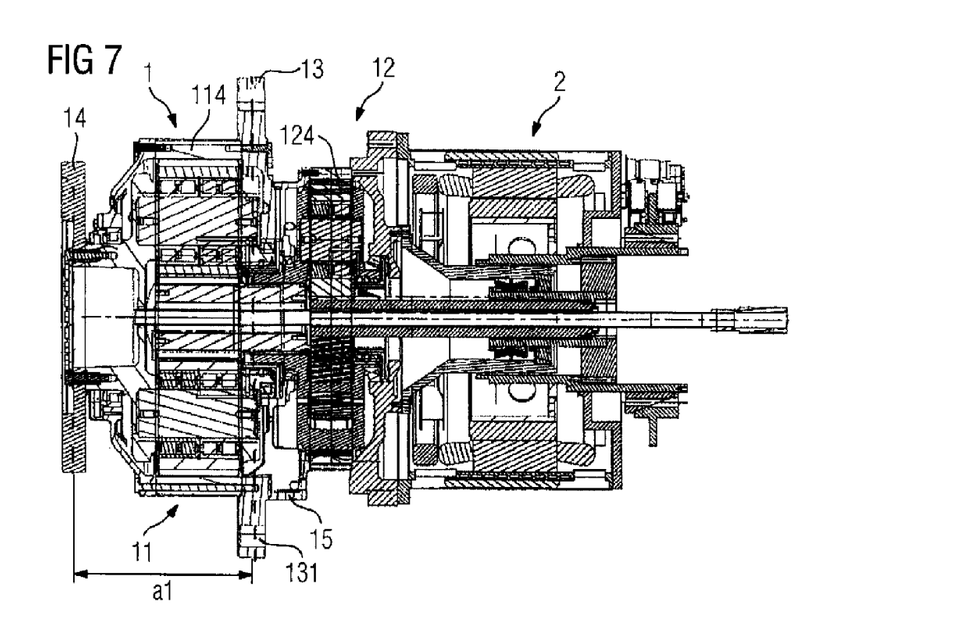
FIG. 7 shows a sectional view of a drive system according to FIG. 1.
Figure 8:
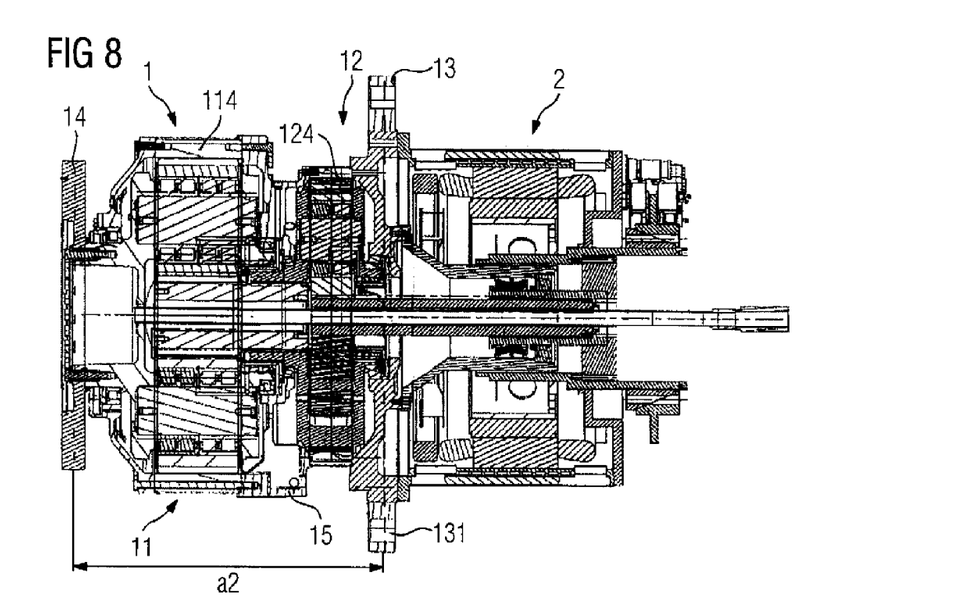
FIG. 8 shows a sectional view of a drive system different from FIG. 7.

FIGS. 5 and 6 each illustrate two ring segment supports 13a, 13b for partially circumferential fully cardanic suspension of the drive system. The ring segment supports 13a, 13b each have several essentially equidistantly arranged boreholes 131 in the circumferential direction, into which elastic bolts are inserted. In addition the elastic bolts are connected to corresponding torque supports 71, 72 on the supporting structural element 7 of the wind turbine. According to the exemplary embodiment illustrated in FIG. 5 the corresponding torque supports 71, 72 are attached directly to the supporting structural element 7 of the wind turbine. In contrast the corresponding torque supports according to the exemplary embodiment illustrated in FIG. 6 each comprise a support arm 71a, 72a, an end section of which is inserted into a receptacle 73, 74 on the supporting structural element, where it is connected thereto. Thus installation in the manner of a conventional two-arm support is retained, without the need to adjust the main frame on the wind turbine. Because of the absence of constraining force, known elastomer supports can be used, which are preferably designed fully in accordance with vibration-damping criteria.

In the exemplary embodiments illustrated in both FIG. 5 and in FIG. 6 the corresponding torque supports on the supporting structural element 7 each comprise a ring segment with essentially equidistantly arranged boreholes 131 in the circumferential direction. Into these boreholes 131 are inserted the elastic bolts, which just as in the case of the exemplary embodiment according to FIG. 4 can be embodied as axially removable elastomer bolts. Preferably the symmetry axis of the torque supports and the rotational axis of the drive system intersect.

FIGS. 7 to 10 show several variants of a drive system according to FIG. 1, each in a sectional view. The variants differ in respect of an axial arrangement of the suspension 13 on the gear housing 15. In the case of the variant illustrated in FIG. 7 the suspension 13 is axially arranged at a distance a1 from the coupling flange 14 in a region between first 11 and second planet wheel stage 12. According to the variant according to FIG. 8 the suspension 13 is axially arranged at a distance a2 from the coupling flange 14 in a region between second planet wheel stage 12 and generator unit 2 and is aligned to a center of gravity of the drive system.

A large axial spacing between coupling flange 14 and suspension 13 means that a large axial displacement caused by deformations of the main frame as well as an angular offset of shafts of the drive system can easily be compensated for. In principle coupling flange 14 and suspension 13 can also be arranged in a common plane without any axial spacing between them.

Figure 9:
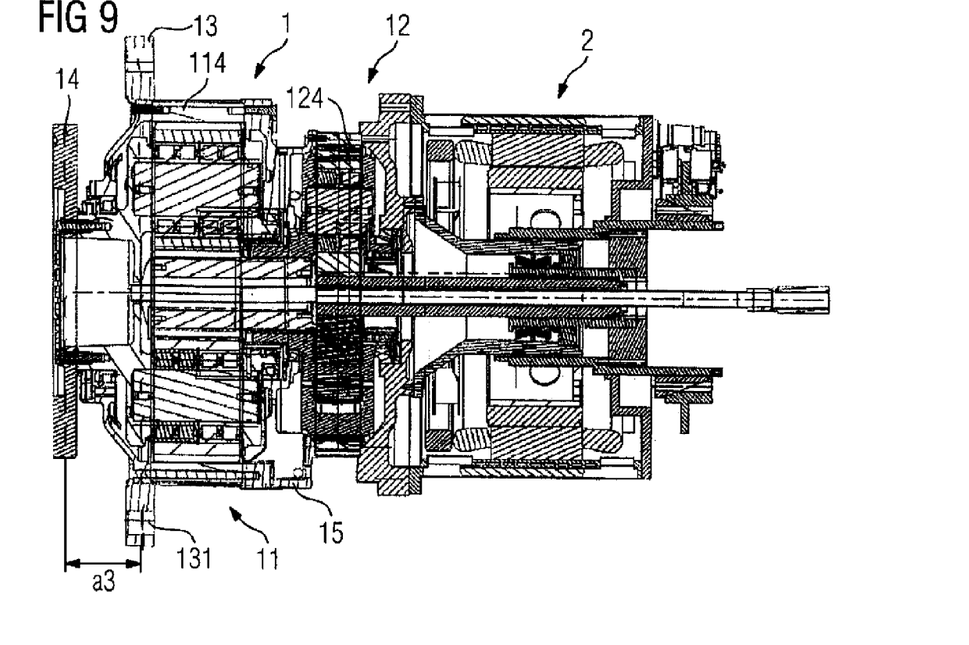
FIG. 9 shows a sectional view of another drive system different from FIG. 7.
Figure 10:
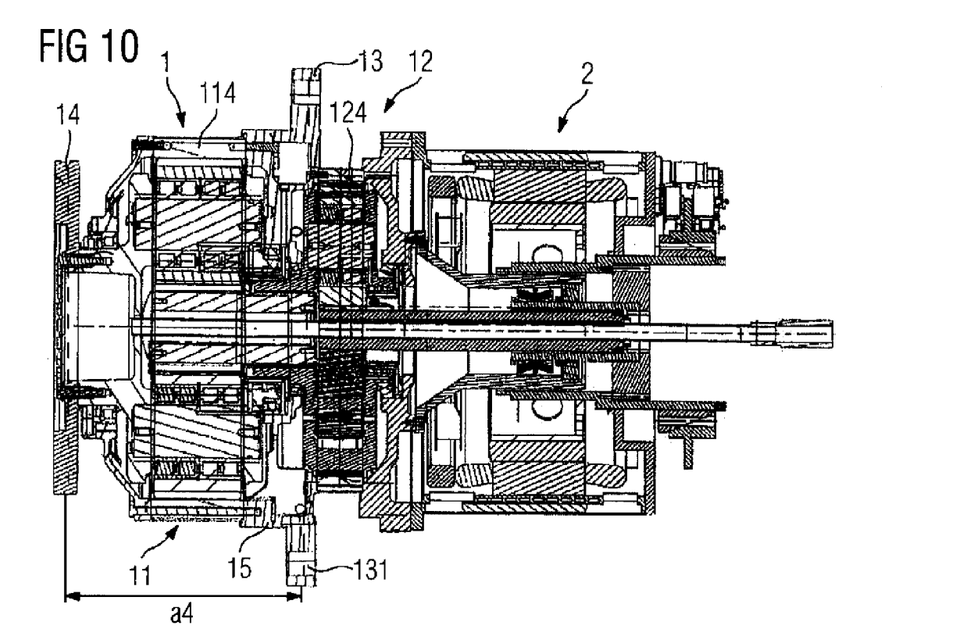
FIG. 10 shows a sectional view of another embodiment of a drive system.

In the variant illustrated in FIG. 9 the suspension 13 is axially arranged at a minimized distance a3 from the coupling flange 14 in a region between coupling flange 14 and first planet wheel stage 11. A further reduction in the axial spacing between coupling flange 14 and suspension 13 in comparison to the variant according to FIG. 9 can for example be achieved with an offset flange plate. According to the variant according to FIG. 10 the suspension 13 is axially arranged at a distance a4 from the coupling flange 14 in a region between first 11 and second planet wheel stage 12 in a manner which optimizes force flow and center of gravity and offers corresponding advantages.

In addition, the coupling flange according to another embodiment can have several rows of boreholes offset to one another, into which axially removable elastomer bolts are inserted. As a result the external diameter of the coupling flange can be designed to be smaller, with the same spacing between boreholes.

Furthermore, the stiffness of the elastomer bolts can be adjusted differently according to diameter and type of flange. In particular, the coupling flange with a smaller diameter compared to the suspension can be made of a harder material, while the suspension can be manufactured from a softer material.

The use of the drive system described is not restricted just to wind turbines, but is also conceivable for example in mill drive systems, in which the generator unit is replaced by a motor unit.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A drive system for a wind turbine comprising:
   a transmission unit comprising at least one planet wheel stage having a hollow wheel, several planet wheels, a planet carrier and a sun wheel,
   a first shaft associated with the transmission unit and comprising a coupling flange configured to be elastically connected to a work machine shaft or a rotor shaft and to be supported by the planet carrier, and
   a gear housing enclosing the transmission unit and a motor unit or generator unit connected to a second shaft of the transmission unit, with the gear housing comprising a circumferentially symmetric or partially symmetric flexible suspension for connection to a supporting structural element of the wind turbine,
   wherein the flexible suspension is formed by a one-piece ring support fully circumferentially radially enclosing the gear housing, or by two ring segment supports partially circumferentially radially enclosing the gear housing, with the ring support or each of the two ring segments comprising several circumferentially arranged and substantially equidistantly boreholes configured to receive elastic bolts for connection to a corresponding torque support on the supporting structural element of the wind turbine.

2. The drive system of claim 1, wherein the flexible suspension formed by the one-piece ring support fully circumferentially radially encloses the gear housing, and wherein the torque support comprises a ring element with circumferentially arranged substantially equidistantly boreholes configured for insertion of elastic bolts.

3. The drive system of claim 2, wherein the torque support comprises two symmetrically or asymmetrically integrally formed support arms with end sections, wherein each of the end sections is configured for insertion into and connection to a corresponding receptacle on the supporting structural element.

4. The drive system of claim 1, wherein the flexible suspension formed by the two ring segment supports partially circumferentially radially encloses the gear housing, wherein each of the torque supports comprises a ring segment with circumferentially arranged substantially equidistantly boreholes configured for insertion of elastic bolts.

5. The drive system of claim 4, wherein each of the torque supports comprises a support arm having end sections, wherein each of the end sections is configured for insertion into and connection to a corresponding receptacle on the supporting structural element.

6. The drive system of claim 1, wherein the elastic bolts of the flexible suspension are axially removable elastomer bolts, and wherein the coupling flange has several circumferentially arranged substantially equidistantly boreholes configured for insertion of axially removable elastomer bolts for connection to a corresponding work machine shaft coupling flange or a rotor shaft coupling flange.

7. The drive system of claim 6, wherein a shaft arrangement of the transmission unit can be removed and/or inserted in a radial direction of the drive system when the elastomer bolts of the flexible suspension and of the coupling flange are removed.

8. The drive system of claim 1, wherein the transmission unit comprises add-on units mounted directly on the supporting structural element of the wind turbine and are decoupled from the gear housing via the flexible suspension as well as via a flexible coupling disposed between the work machine shaft or the rotor shaft and the first shaft of the transmission unit.

9. The drive system of claim 8, wherein the add-on units comprise an element selected from an oil system, a cooler and hydraulics.

10. The drive system of claim 1, wherein the supporting structural element is a foundation bearing with a connection to a frame or a nacelle of the wind turbine.

11. The drive system of claim 1, wherein the transmission unit comprises a first main bearing and a second main bearing arranged between planet carrier side walls and the gear housing, with the first main bearing and the second main bearing supporting the first shaft of the transmission unit.

12. The drive system of claim 1, wherein the transmission unit comprises a coaxially arranged first and second planet wheel stage.

13. The drive system of claim 12, wherein a gear ratio of the second planet wheel stage is selected so as to produce substantially identical external diameters of the stator of the generator unit and the hollow wheel of the second planet wheel stage when a number of generator poles is selected to be divisible by 3 and the drive system is optimally designed for a rated speed.

14. The drive system of claim 1, wherein the motor unit or generator unit has three independent winding systems which are connected to a full power converter.

15. The drive system of claim 14, wherein each pole of the motor unit or the generator unit has a separately insulated motor or generator winding, with the three independent winding systems being connected outside the gear housing.

16. The drive system of claim 15, wherein the motor unit or generator unit comprises between 12 and 24 poles.

17. The drive system of claim 14, wherein the motor or generator unit comprises a rotor which is connected in a rotationally fixed manner to a hollow shaft, and a brake disk connected in a rotationally fixed manner to the hollow shaft.

18. The drive system of claim 17, wherein the brake disk is arranged on an end face of the motor unit or generator unit facing away from the transmission unit.

19. The drive system of claim 17, wherein the rotor of the motor unit or generator unit comprises a grounding brush.

20. The drive system of claim 1, wherein the transmission unit comprises motor-side bearings and generator-side bearings, wherein the motor-side bearings or the generator-side bearings are constructed to be electrically insulating.

21. The drive system of claim 1, wherein the first shaft of the transmission unit is a gearbox-side drive shaft and the second shaft of the transmission unit is a gearbox-side output shaft, with the coupling flange of the gearbox-side drive shaft configured to be connected to the rotor shaft.

* * * * *